Dec. 29, 1942.  J. GLOSS  2,306,693
MEDICAL SHORT-WAVE MEASURING APPARATUS
Filed Sept. 15, 1939

INVENTOR.
JAN GLOSS
BY
ATTORNEY.

Patented Dec. 29, 1942

2,306,693

UNITED STATES PATENT OFFICE 2,306,693

MEDICAL SHORT-WAVE MEASURING APPARATUS

Jan Gloss, Zurich, Switzerland, assignor to Gaspar Rubli, Zurich, Switzerland

Application September 15, 1939, Serial No. 295,035
In Switzerland October 4, 1938

8 Claims. (Cl. 250—33)

The frame aerial or self-induction coils of known construction used for receiving purposes, show a marked direction-effect when receiving high frequency signals direct, as often used for direction finding. This direction-effect has to be taken into consideration when measurements have to be taken of the incoming high frequency signals. In order to be able to measure the intensity of a high frequency field, such as is built up between the electrodes of a medical short wave generating set (patient's circuit), a frame aerial is not applicable owing to its marked direction effect and therefore suitable measuring devices for such fields have not been known up to the present. A particular difficulty consists in the organs and tissues of the human body which lie in the field as they produce a more or less marked concentration of the high frequency field and a curvature of the force lines. In order to be applicable for medical purposes, the receiving sets known until now would therefore need a receiving circuit which can be brought into the direction of the force lines of the patient's circuit, which in practice, however, is not possible. Up till now the field intensity in the patient's circuit could not be measured or defined so that the doctor, when using short wave therapy, has only been able to rely upon his own feeling and experience coupled with the patient's statements.

The object of the present invention, as described hereafter, is the formation of an inductance device for measuring the field intensity of an electrical high frequency field, particularly for use in short wave therapy. The present invention aims at a device to create such inductance without any direction-effect at all. For this purpose a number of continuous loops wound in equal angular distances and distorted one to the other are brought on to a rotation body, so that the resulting total field-effect lies in a radial direction independent of the radial position of the said rotation body.

The annexed drawing shows the present invention carried into effect according to two examples of construction:

Figure 1:
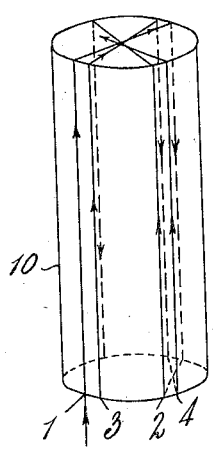
Fig. 1 shows schematically the design of the first example of the said inductance device.
Figure 2:
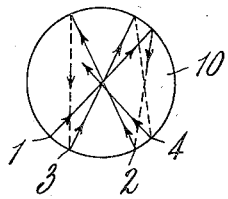
Fig. 2 is a flat view of Fig. 1.
Figure 3:
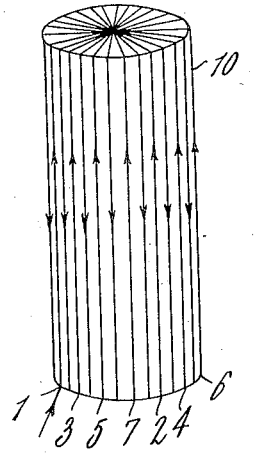
Fig. 3 shows a view of the complete inductance device.

The example in Figs. 1–3 consists of a drum 10, the length of which is a multiple of its diameter. Loops are wound in axial planes on the drum 10, by which every two continuous loops are distorted in respect to the initial plane at 90° (±) plus or less the step of winding. It indicates 1 the beginning of the first loop, 2 the beginning of the second, distorted at 90° (±) the step of winding in respect to the plane of the first loop, 3 the beginning of the third loop, etc. As will be seen from Fig. 3, a symmetrical arrangement of the loops is thus obtained.

It is to be noted that the expression 90° (±) refers to a pitch or skew angular displacement between successive or adjacent loops of the winding. This angular displacement is equal to 90° plus or minus another given angle ($\alpha$) which is less than 90°. The skew angular displacement seen in Figs. 1–3 is less than 90°, and may be represented as (90°−$\alpha$). Also the winding in this embodiment is with equally displaced pairs of loops, symmetrically alternated. It is to be understood that different (90°±$\alpha$) angular arrangements are feasible. Also, it is significant as illustrated in Fig. 3 that the adjacent elements of the loops have their currents flowing in opposite directions. This is the preferred arrangement for the adjacent loop coil elements after the completion of the winding in the prescribed manner over 360° of arc. The resultant winding is substantially non-directional in its pick-up characteristics.

The resulting total field-effect of such an inductance will thus in radial direction be quite independent from the position of the drum. With this inductance device complete measuring of the field intensity can be undertaken without any correction being necessary due the direction-effects. By a combination of such a self-induction winding with an appropriate rectifier for high frequency currents, such as rectifiers of dry or liquid type, detectors or high vacuum rectifier valves, the measuring of field intensity in or around a patient's body, who is present in a high frequency field, can be undertaken. The inductance device may be of such small diameter that it can be inserted in the apertures of the human body.

Figure 4:
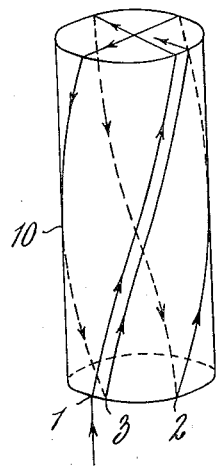
Fig. 4 shows the design of a second example of the said inductance device.

The example in Fig. 4 differs from the example in Fig. 1 in that the single loops or windings are not placed in axial planes but are led along screw lines with, for instance, a pitch of ¼ drum length.

Instead of being brought on a drum, the loops or windings can be brought in the same way on another rotation body, as, for instance, on a ball.

Having now particularly described and ascertained the nature of my said invention and in what manner the same is to be performed, I declare that what I claim is:

1. An inductance device of the character described comprising a continuous winding of successive loops wound with successive skew angular displacements of an angle which differs from 90° by a smaller amount and which is divisible into 180° with a remainder between the respective areas thereof and symmetrically alternated with respect to a predetermined pair of loops in equal angular advances completing 360° of arc whereby the electrical field pickup by the device is substantially non-directional in character.

2. A substantially non-directional inductance device for measuring high frequency fields comprising a continuous winding of successive loops with the first two loops thereof wound with an angular displacement of an angle which differs from 90° by a smaller amount and which is divisible into 180° with a remainder between the respective longitudinal areas thereof and the remaining loops symmetrically alternated in pairs with respect to said two loops in angular advances substantially equal to said angular displacement between said first two loops, all of said loops symmetrically completing 360° of arc.

3. An inductance device of the character described for measuring high frequency fields comprising a tubular coil form containing a continuous winding of successive loops wound with successive angular displacements of an angle which differs from 90° by a smaller amount and which is divisible into 180° with a remainder between respective longitudinal areas thereof, said loops overlapping and symmetrically covering said coil form whereby the radial electrical field pick-up by the device is substantially non-directional in character.

4. A substantially non-directional inductance device of the character described for measuring high frequency fields comprising a cylindrical coil form with its length a multiple of its diameter containing a continuous winding of successive loops with the first two loops thereof wound with an angular displacement of an angle which differs from 90° by a smaller amount and which is divisible into 180° with a remainder between the respective longitudinal areas thereof and the remaining loops symmetrically alternated with respect to said two loops in angular advances substantially equal to said angular displacement between said first two loops and overlapping to complete the winding over 360° of arc.

5. An inductance device of the character described for measuring high frequency fields comprising a continuous winding of tubular shape, with the individual loops of the winding being progressively displaced with respect to preceding loops by an angle which differs from 90° by a smaller amount and which is divisible into 180° with a remainder and successively continued at substantially equal angular displacements with successive loops overlapping to symmetrically complete the winding whereby the electrical field pick-up by the device is substantially non-directional in character.

6. A substantially non-directional inductance device of the character described for measuring high frequency fields comprising a cylindrical coil form with its length a multiple of its diameter containing a continuous winding, with the individual loops of the winding being progressively displaced with respect to adjacent loops by an angle which differs from 90° by a smaller amount and which is divisible into 180° with a remainder and successively continued at substantially equal angular displacements to symmetrically complete the winding over 360° of arc.

7. An inductance coil for measuring high frequency fields comprising a body of rotation coil form containing a continuous surface winding of successive loops having symmetrically an angular displacement with respect to adjacent loops equal to an angle which differs from 90° by a smaller amount and which is divisible into 180° with a remainder, whereby the electrical field pick-up by the device is substantially non-directional in character.

8. A substantially non-directional inductance coil for measuring high frequency fields comprising a body of rotation coil form containing a continuous surface winding of successive loops having an angular displacement with respect to adjacent loops equal to an angle which differs from 90° by a smaller amount and which is divisible into 180° with a remainder and wound in a manner resulting in adjacent loop elements having opposite current directions.

JAN GLOSS.